Patented Mar. 5, 1946

2,396,165

UNITED STATES PATENT OFFICE 2,396,165

PROCESS FOR PREPARING CELLULOSE ESTER IN FIBER FORM

Maurice Leon Ernsberger, Wilmington, Del., and Arthur Stanley Gregory, Camp Carson, Colo., assignors to E. I. du Pont de Nemours & Company, Wilmington, Del., a corporation of Delaware No Drawing. Application August 26, 1943, Serial No. 500,134

2 Claims. (Cl. 18—54)

This invention relates to cellulose esters. More particularly, it relates to the vulcanization of unsaturated cellulose esters and to the products so obtained.

Cellulose esters are widely used in such important applications as films, fibers, molded articles and as ingredients of lacquers and fabric coating compositions. In many uses, such properties as solvent resistance and resilience, which the cellulose esters do not naturally possess to a great degree, are highly desirable. A variety of treatments has been proposed to modify cellulose esters in such a way that they will possess these desirable properties. Improvements have been obtained in many instances but they are often accompanied by objectionable changes such as embrittlement or loss of strength. Furthermore, in many instances, the procedures heretofore proposed have involved technical difficulties and the use of expensive modifying agents.

It is an object of this invention to provide a simple and inexpensive process for the modification of cellulose esters which process improves their solvent resistance, resilience and impact strength. Another is to provide cellulose esters characterized by high solvent resistance, resilience and softening point. Further objects will appear as the description proceeds.

These objects are accomplished by heating at a temperature of at least 80° C., an intimate mixture of sulfur and an organic rubber vulcanization accelerator with an organic solvent soluble cellulose mixed carboxylate ester of a saturated acid and of an unsaturated acid, said ester having not more than 0.5 unsaturated ester substituent per glucose unit, in which ester all ester substituent groups, whether saturated or unsaturated, are acyclic and contain not more than 6 carbon atoms, until the product is no longer appreciably soluble in solvents in which the unmodified ester is soluble.

The mixed saturated-unsaturated cellulose esters to be vulcanized in accordance with the process of this invention may be prepared by methods known in the art for the preparation of mixed cellulose esters. For example, cellulose may be treated with a properly selected mixture of saturated and unsaturated acids or anhydrides and an esterification catalyst such as sulfuric acid. The ratio saturated/unsaturated ester substituent may be controlled by proper adjustment of the saturated and unsaturated acylating reactants. In an alternative procedure, cellulose partly esterified with an unsaturated acid may be esterified further with a saturated acid or vice versa.

The more detailed practice of the invention is illustrated by the following examples, wherein parts given are by weight. There are of course many forms of the invention other than these specific embodiments.

Example I

In 30 parts of acetone saturated with sulfur there are dissolved 5 parts of cellulose acetate methacrylate (2.22 acetyl and 0.26 methacryl groups per glucose unit) and 0.25 part of tetraethyl thiuram disulfide. After agitating the mixture for 17 hours at room temperature, a clear, amber-colored solution is obtained which is cast into a film. The film is dried in the air for 6 hours at room temperature, then heated at 150° C. for 16 hours, after which it shows no tendency to dissolve in acetone even after being in contact with the solvent for 30 hours.

Similar results are obtained when the same cellulose acetate methacrylate is heated at 130–175° C. for 2–24 hours in intimate contact with 1–5% by weight of zinc dibutyl dithiocarbamate and 0.5 to 5% by weight of sulfur. The vulcanizing ingredients are conveniently introduced in the cellulose mixed ester by dissolving the same in a common solvent and casting a film therefrom.

Example II

A yarn of cellulose acetate crotonate (2.5 acetyl and 0.1 crotonyl groups per glucose unit) containing 1% by weight of epsilon-thiocaprolactam, 2% by weight of dibenzyl tetrasulfide, and 0.3% by weight of sulfur is spun from an acetone solution, in which all the components are soluble. After heating for 8 hours at 150° C., the yarn shows marked improvement in resilience, as indicated by the higher values for crease angle, elastic recovery and impact strength shown below, and excellent resistance to solvents of the type used in dry cleaning. The yarn was readily dyed with typical cellulose acetate dyes such as "Celanthrene" Brilliant Blue, had a softening point above 200° C. and showed excellent resistance to boiling water and soap solution. The properties of the vulcanized yarn are compared with those of the unmodified yarn in the table below:

| Yarn property | Unmodified yarn | Vulcanized yarn |
| --- | --- | --- |
| Tenacity, g./d., dry | 1.31 | 1.35 |
| Tenacity, g./d., loop | 1.29 | 1.34 |
| Tenacity, g./d., wet | 0.83 | 0.85 |
| Percent elongation, dry | 13.8 | 13.7 |
| Percent elongation, loop | 12.8 | 12.0 |
| Percent elongation, wet | 19.6 | 17.4 |
| Crease angle | 120° | 136° |
| Percent recovery from loop crease after 10 seconds | 70 | 88 |
| Elastic recovery from 4% stretch | 67.0 | 84.2 |
| Elastic recovery from 8% stretch | 44.5 | 52.4 |
| Impact strength (g. cm./denier) | 2.5 | 3.1 |

Similar improvements in properties are obtained when the same cellulose acetate crotonate yarn is heated at 175° C. for 1 to 3 hours in intimate contact with 1% by weight of hexamethyleneimine dithiocarbamate and 1.5% by weight of sulfur.

*Example III*

A yarn of cellulose acetate methacrylate (2.15 acetyl and 0.39 methacryl groups per glucose unit) is heated at 175° C. for 2 hours in intimate contact with 1% by weight of tetraethyl thiuram disulfide and 1.5% by weight of sulfur. The resulting yarn shows greatly improved resilience as indicated by improvement in the crease angle from 112 to 148°, and the improvement in elastic recovery (from 4% stretch) from 60 to 91%. It is insoluble in acetone and shows excellent resistance to the solvents commonly used for dry cleaning. These improvements in properties are obtained with materially no change in wet, dry, or loop tenacities or elongation. Furthermore, the softening point of the vulcanized material is higher than that of the unmodified cellulose ester.

Any organic solvent soluble cellulose mixed ester of saturated and unsaturated acids is suitable for the process of this invention provided it has not more than about 0.5 unsaturated ester substituent per glucose unit and provided further that the ester substituents, whether saturated or unsaturated, are acyclic and contain not more than 6 carbon atoms. Cellulose esters having the above-mentioned characteristics give tough vulcanized products which soften at temperatures above 170° C., show excellent resistance to boiling water and to organic solvents and are well adapted for such uses as fibers, films and molded articles. Cellulose esters having long chain substituents give, in general, products having low softening points, poor dyeing properties and reduced resistance to solvents. Too high a degree of unsaturation may result in highly unsaturated vulcanizates which show poor heat and light stability as in brittle, highly crosslinked products. Among the suitable esters may be mentioned cellulose acetate crotonate, cellulose acetate methacrylate, cellulose butyrate acrylate, cellulose acetate propionate methacrylate, cellulose acetate sorbate, cellulose acetate methacrylate crotonate, cellulose propionate acrylate, cellulose acetate pentenoate, etc. Preferably the mixed esters contain between 0.05 and 0.5 unsaturated ester substituents per glucose unit and between 1.2 and 2.9 of saturated ester substituents.

Any organic rubber accelerator may be used, specific examples of which include, in addition to those already mentioned, 2-mercaptothiazoline, mercaptobenzothiazole, 3,5 - dimethylcyclohexanonethiolsoxime, tetramethylthiuram disulfide, pentamethylenethiuram tetrasulfide, etc. The sulfur used in the vulcanization may be in the form of elemental sulfur or it may be supplied by a compound which is capable of liberating sulfur under the vulcanization conditions. Such sulfur-giving compounds are, for example, dibenzyl tetrasulfide and certain accelerators such as pentamethylenethiuram tetrasulfide. The use of sulfur-liberating compounds is very often advantageous, particularly when the sulfur is introduced through the use of a common solvent, since sulfur may not be sufficiently soluble in the common solvent to permit its incorporation in the desired quantity in the cellulose ester. In general, excellent results are obtained by using between 0.5% and 6% by weight of sulfur based on the cellulose ester and from 0.05% to about 2.5% by weight of vulcanization accelerator.

As indicated above, a convenient way of introducing the vulcanizing ingredients into the cellulose ester is by means of a common solvent, from which the cellulose ester, containing the vulcanization ingredients, can be regenerated. It is, of course, also possible to carry out the vulcanization by first mixing the dry ingredients with the dry cellulose ester, in which case they should be in as finely divided a state as possible and mixed as intimately as possible, or by soaking the cellulose ester with a solution of the vulcanizing agents in a solvent which does not dissolve the cellulose ester. Yet another modification of the broad principle is to form first a shaped article (yarn, film, ribbon, molded object) of the cellulose ester, then to deposit the vulcanizing ingredients at the surface thereof and carry out the vulcanization. In the case of relatively large objects so treated the vulcanization is largely superficial.

Below 80° C., vulcanization is impracticably slow. The vulcanization temperature should preferably be above 100° C. and the preferred range is between 135 and 185° C., although higher temperatures can be used provided they do not decompose the cellulose ester. The vulcanization time depends largely on the temperature used and may vary from 5 minutes to 48 hours or even longer. A good criterion of vulcanization is the insolubility of the treated cellulose ester in a solvent in which it was formerly soluble. The herein proposed combination of sulfur and an organic rubber vulcanization accelerator has been found to be ideally adapted for the treatment of cellulose esters because it is much more effective than sulfur alone and does not bring about the objectionable degradation caused by such agents as sulfur chloride, which liberate acidic materials having a detrimental influence on the cellulose esters.

The above description and examples are intended to be illustrative only. Any modification of or variation therefrom which conforms to the spirit of the invention is intended to be included within the scope of the claims.

We claim:

1. Process for preparing an improved cellulose ester in fiber form which comprises dry spinning a solution, in an organic solvent, of a cellulose acetate crotonate having about 2.5 acetyl and 0.1 crotonyl groups per glucose unit, 1% by weight, based on the cellulose ester, of epsilon-thiocaprolactam, 2% by weight, based on the cellulose ester, of dibenzyl tetrasulfide and 2% by weight, based on the cellulose ester, of sulfur and heating the resulting fiber for about eight hours at about 150° C.

2. Process for preparing an improved cellulose ester in fiber form which comprises dry spinning a solution, in an organic solvent, of a cellulose acetate crotonate of about 2.5 acetyl and 0.1 crotonyl groups per glucose unit of the ester, sulfur, epsilon-thiocaprolactam and dibenzyl tetrasulfide and heating the resulting fiber at 135–185° C. until the cellulose ester becomes resistant to dry cleaning solvents.

MAURICE LEON ERNSBERGER.
ARTHUR STANLEY GREGORY.